United States Patent [19]

Yamashita et al.

[11] Patent Number: 5,016,113

[45] Date of Patent: May 14, 1991

[54] APPARATUS FOR REPRODUCING AND PROCESSING PICTURE INFORMATION INCLUDING GRAPHIC CODES FROM A RECORDING MEDIUM

[75] Inventors: Masayasu Yamashita; Masami Suzuki; Junichi Yoshio; Osamu Watanabe, all of Tokorozawa, Japan

[73] Assignee: Pioneer Electronic Corporation, Tokyo, Japan

[21] Appl. No.: 247,564

[22] Filed: Sep. 22, 1988

[30] Foreign Application Priority Data

Apr. 4, 1988 [JP] Japan .................................. 63-82621
Apr. 4, 1988 [JP] Japan .................................. 63-82623

[51] Int. Cl.[5] .............................................. H04N 5/76
[52] U.S. Cl. .................................. 358/335; 358/342
[58] Field of Search ............... 358/342, 355, 341, 343, 358/906; 360/39, 40, 48, 53, 10.1, 19.1, 32, 77.01, 77.02, 35.1; 369/32, 59, 33

[56] References Cited

U.S. PATENT DOCUMENTS

| | | |
|---|---|---|
| 4,477,841 | 10/1984 | Chen et al. ........................ 358/335 |
| 4,490,810 | 12/1984 | Hon .................................. 358/342 |
| 4,597,006 | 6/1986 | Orsburn .............................. 358/22 |
| 4,635,136 | 1/1987 | Ciampa et al. . |
| 4,729,043 | 3/1988 | Worth ................................ 358/342 |
| 4,754,270 | 6/1988 | Murauchi .......................... 340/735 |
| 4,761,692 | 8/1988 | Yoshida et al. .................... 358/335 |
| 4,816,925 | 3/1989 | Hayashi ............................. 358/342 |
| 4,839,746 | 6/1989 | Kanamaru ......................... 358/342 |
| 4,897,636 | 1/1990 | Nishi et al. ....................... 340/724 |

Primary Examiner—Roy N. Envall, Jr.
Assistant Examiner—Huy Nguyen
Attorney, Agent, or Firm—Wegner, Cantor, Mueller & Player

[57] ABSTRACT

An apparatus for reproducing and processing picture information for forming a picture signal corresponding to a graphic code obtained from a recording medium on which, in addition to a video format signal and a coded information signal, graphic codes including picture information are recorded, the graphic codes being inserted as a subcode of the coded information signal, and for mixing the picture signal in the video format signal obtained from the recording medium.

The apparatus is provided with a display mode changing device for changing a mode of display of the picture signal in response to the display mode changing command. According to another feature, a plurality of memories for storing a plurality of graphic codes are provided, and a graphic code of a designated channel is read-out when the designation of channel is changed.

5 Claims, 16 Drawing Sheets

Fig. 5

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q ||||||
| 3 | ||||||
| 4 | COLOR 0 ||||||
| 5 | ||||||
| 6 | ⋮ ||||||
| 17 | ||||||
| 18 | COLOR 7 ||||||
| 19 | ||||||
| 20 | PARITY P ||||||
| 23 | ||||||

Fig. 4

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | PARITY Q ||||||
| 3 | ||||||
| 4 | CHANNEL || COLOR 0 ||||
| 5 | CHANNEL || COLOR 1 ||||
| 6 | 0 | ROW |||||
| 7 | COLUMN ||||||
| 8 | FONT ||||||
| 19 | ||||||
| 20 | PARITY P ||||||
| 23 | ||||||

Fig. 8

| TCB || MODE | SUBCODE PICTURE | MOTION PICTURE |
|---|---|---|---|---|
| 0 | 0 | TRANSPARENT MODE | 0 % | 100 % |
| 1 | 0 | MIXING MODE | M % | (100-M) % |
| 1 | 1 | NON-TRANSPARENT MODE | 100 % | 0 % |

Fig. 6

| MODE | ITEM | |
|---|---|---|
| 0 0 0 | 0 0 0 | ZERO MODE |
| 0 0 1 | 0 0 0 | LINE-GRAPHICS MODE |
| 0 0 1 | 0 0 1 | TV-GRAPHICS MODE |
| 0 0 1 | 0 1 1 | GRAPHICS MODE WITH MOTION PICTURE |
| 1 1 1 | 0 0 0 | USER'S MODE |

Fig. 7

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | | TCB-1 | | TCB-2 | |
| 5 | TCB-3 | | TCB-4 | | TCB-5 | |
| 6 | TCB-6 | | TCB-7 | | TCB-8 | |
| 7 | TCB-9 | | TCB-10 | | TCB-11 | |
| 8 | TCB-12 | | TCB-13 | | TCB-14 | |
| 9 | TCB-15 | | 0 | 0 | 0 | 0 |
| 10 | 0 | 0 | 0 | 0 | 0 | 0 |
| ⋮ | | | | | | |
| 19 | 0 | 0 | 0 | 0 | 0 | 0 |
| 20 | PARITY P | | | | | |
| ⋮ | | | | | | |
| 23 | | | | | | |

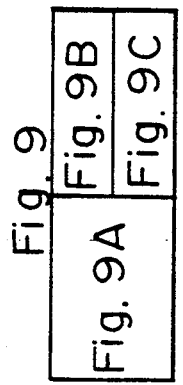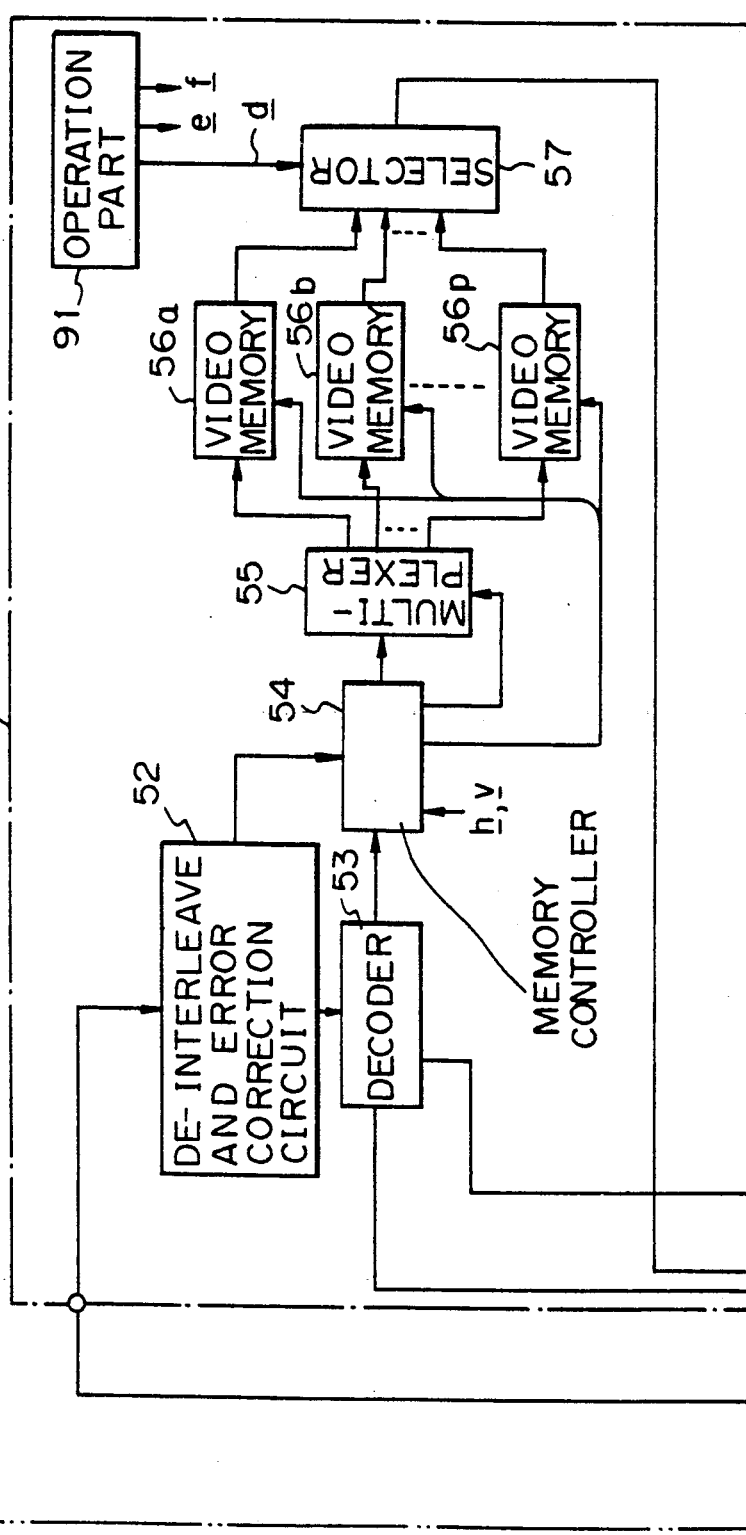
Fig. 9B

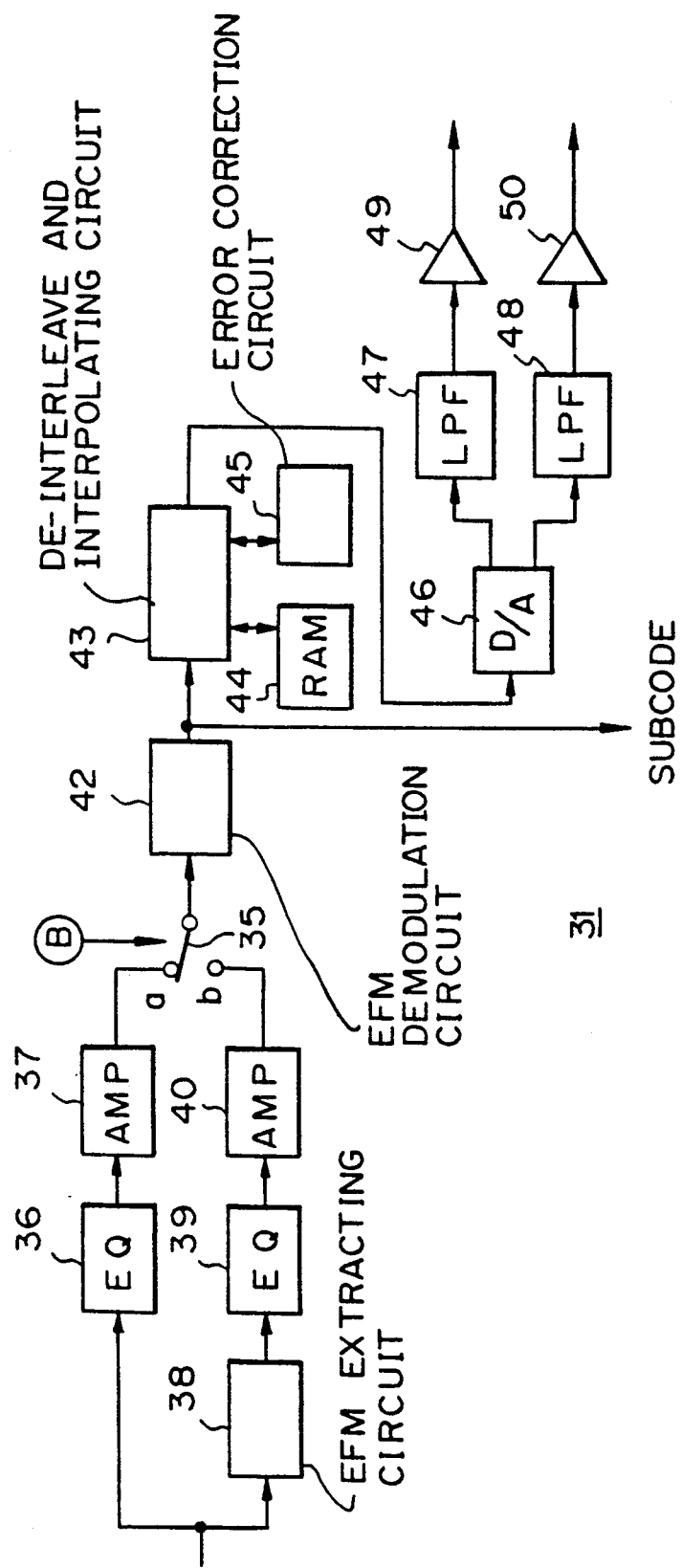

MOVING PICTURE

SUBCODE

DREAMS-
WHAT
WEAVES
THE HUMAN
NATURE

APPARATUS FOR REPRODUCING AND PROCESSING PICTURE INFORMATION INCLUDING GRAPHIC CODES FROM A RECORDING MEDIUM

BACKGROUND OF THE INVENTION

1. Field of the Invention

The present invention relates to a picture information reproducing and processing apparatus for generating a picture signal from picture information recorded, as the subcode of a coded information signal such as a digital audio signal, on a recording medium such as a video disc, a digital audio disc, and so on.

2. Description of Background Information

In the case of recording media on which are recorded contents of a movie source (or film source, in other words) such as video discs, it is general that superimposing characters such as captions (translation of dialogues) is recorded as a part of information forming a picture. On the other hand, conventional apparatuses for reproducing and processing picture information recorded on such a recording medium are constructed to simply reproduce the superimposing characters such as captions as a part of picture information obtained from a recording medium. With the conventional apparatuses for reproducing and processing picture information, superimposing characters are displayed only in the lower end part or the right end part of a picture screen, and such a mode of display is sometimes annoying. Thus, there have been a problem that viewers tend to fix the eyes on the displayed characters, and it becomes difficult for the viewers to follow the movement of picture on the whole to be watched attentively.

On the other hand, a system is now proposed in which picture information is recorded and reproduced in the form of the subcode on and from a digital audio disc having a diameter of approximately 12 cm which is generally designated as compact disc (referred to as the CD hereinafter). The subcode is made up of eight subcode bits, and bit groups forming the subcode are divided into eight channels denoted respectively by letters P, Q, R, S, T, U, V, and W. In the system in which the picture information is recorded and reproduced in the form of subcode, data corresponding to picture information is configured such that a symbol is formed by 6 bits of channels R through W out of the 8 bits forming the subcode, and 98 symbols are treated as one block, as illustrated in FIG. 1. Two symbols in the 98 symbols are used as a sync signal, and 24 symbols obtained by dividing the remaining 96 symbols, by four are treated as a minimum unit of data, i.e. a "pack", which constitutes one instruction of picture processing.

More specifically, the first symbol (referred to as symbol 0 hereinafter) of the 24 symbols shows one of several modes. A symbol 1 following this symbol 0 forms "instruction" which indicates the sort of instruction. Symbols 2 and 3 following the symbol 1 constitute a parity Q which is an error correction code. Symbols 4 through 19 following the parity Q constitute a data field, and include information such as color information. Finally symbols 20 through 23 following the data field constitute a parity P which is an error correction code for protecting the information in the "pack".

On the other hand, there are four modes, i.e. "zero mode", "line-graphics mode", "TV-graphics mode", and "user's mode". The "zero mode" is provided for a case where no operation is required for pictures on the display screen, that is, the original image is to be maintained, and all data in the "pack" are 0 for this mode.

The "line-graphics mode" is provided for such a case that a liquid crystal display is provided on the front face of the player, to display notes such as an explanation of a music selection. As shown in FIG. 2, a picture area being long sideways is formed by pixels which are arranged in 288 columns and 24 rows. In other words, each row includes 288 pixels and each column includes 24 pixels. The term "pixel" stands for the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the Screen area, to form a picture area having 60 "fonts" in the direction of row, and 4 "fonts" in the direction of column. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

As instructions for the picture processing, there are an instruction for painting out the whole picture area by one certain color, an instruction for drawing a picture in one "font" on the screen by using two different colors, an instruction for moving the whole picture upward or sideways, and so on.

Additionally, in the 8-bit groups forming the subcode, the Q bits forming the channel Q include time information corresponding to the track length to a certain position of each information data which is recorded from the beginning of the program area of CD, and form address time data which can be used as positional data representing the recording position. On the other hand, the P bits forming the channel P form data including information relating to a pause between two music selections.

This system for recording and reproducing picture information as the subcode is designed so that sixteen picture channels can be designated respectively at maximum. Specifically, a "write font foreground/background" instruction, used in the "TV-graphics mode" for example, has such a structure as illustrated in FIG. 4. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of picture are previously recorded on a disc for example, and on the playing side, a desired picture channel can be selected at the time of playing by this scheme of designating the picture channel.

In addition, there are numbers from "0" to "15" as the color number. Different sixteen colors are respectively corresponding to these color numbers from "0" to "15", and the sixteen colors indicated by the color number "0" through "15" are set by a "load CLUT color 0 through color 15 (load color look-up table color 0 through color 15)" instruction in the "TV-graphics mode". The "load CLUT color 0 through color 15" instruction is an instruction having a structure illustrated in FIG. 5, and setting the contents of a color look-up table showing the color of pre-set color numbers or foreground/background color numbers it is necessary to designate sixteen colors in total. However, since four bits are used respectively for each of RGB to indicate a color, two symbols are required for setting one color. Therefore, eight colors are set by one "pack " at most. With this circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color s through color 15 are determined to be "31". The mixing of colors for each of the color number is as follows. Red color is represented by four bits of the channels R through U of even symbols allotted to the color number Green color is represented by four bits, i.e. two bits of the channels V and W following the channels R through U of the even symbols, and two bits of the channels R and S of odd symbols. Blue color is represented by four bits of channels T through W following the channels R and S of the odd symbols. Therefore, $2^4 (=16)$ sorts of gray scales are available for each color, and preparation of $16^3 (=4096)$ colors is possible since three colors (RGB) are used. In addition, a gray scale "0000" corresponds to the darkest state, and a gray scale "1111" corresponds to the brightest state.

In order to make it possible to display the picture obtained from a recording medium by the recording and reproducing system using the subcode, and the picture by a video format signal recorded on the recording medium such as a video disc by using an FM modulation, in a picture screen, it is proposed separately by the applicants of the present application and others, to set a code to be inserted as the symbol 0 as shown in FIG. 6 in order to designate an additional mode, that is, "graphic mode with motion picture" in addition to the "zero mode" the "line-graphics mode", the "TV-graphics mode" and the "user's mode" which are also used in conventional methods.

The structure of picture in the "graphics mode with motion picture" is identical with that in the "TV-graphics mode", and an instruction designated as "load transparency control table" having such a structure as shown in FIG. 7 is provided. This "load transparency control table" instruction is an instruction for designating the mode for each pixel in picture area. Three modes ar designated by this instruction, and those are namely, "transparent mode", "mixing mode", and "non-transparent mode". In these three modes, different values are selected for the mixing ratio between a video format signal obtained by the subcode and a video format signal which is recorded by multiplexing together with the coded information signal including the subcode.

The bits in the channels R through W of each of the symbols 4 through 8 and the channels R and S of the symbol 9 constitute a series of codes TCB-0 through TCB 15 which respectively designate one of modes which will be described later for each of the group of pixels to which one of colors, which are registered as color number "0" through color number "15", is allotted. FIG. 8 shows a relationship between bit patterns of the codes TCB-0 through TCB-15 and the modes designating the mixing ratio, and the mixing ratio in each mode.

With the recording and reproducing system which has been explained above, the picture obtained by the subcode of the digital audio signal ca be superimposed as the superimposing caption on a picture by a video format signal which is recorded, after being processed by an FM modulation process, with the digital audio signal by using a frequency multiplex recording system.

If an apparatus having a structure for only processing the instructions of picture processing, as a picture information reproducing and processing apparatus for reproducing picture information from a recording medium on which the picture information is recorded by this recording and reproducing system, the characters of the superimposing caption will be displayed only in a mode determined at the time of recording, and the display can sometimes become annoying.

On the other hand, with respect to conventional apparatuses for reproducing and processing picture information recorded on a recording medium by using the system of recording picture information as the subcode, the structure is such that picture information of a designated channel out of picture information obtained from the recording medium is selectively taken-in and written in a single memory, and a picture signal is generated by repeatedly reading contents stored in that memory. However, in this system of recording and reproducing picture information as the subcode, the time period necessary for displaying a picture of one "font" is about 3.3/1000 second, and about 2.5 seconds are necessary for displaying $48 \times 16$ characters. Further more, picture information of all channels are not always recorded correspondingly to each music selection, and there may be a case that picture information of the same channel is recorded in positions which are separated from each other. Thus, in conventional picture information reproducing and processing apparatuses, stored contents of the memory are not immediately rewritten to data of a newly designated channel when the designation of channel has changed. Instead, the contents of the memory will be gradually rewritten to the data of the designated channel.

As a result, with the conventional picture information reproducing and processing apparatuses, there can be such a case that pictures of different channels are displayed at different positions of a picture screen. Therefore, if the superimposing captions of several different languages are recorded respectively in several channels and the apparatus is designed that the cap ion of a desired language is superimposed by designating one of the channels, then the language of the superimposed caption can be different between the first half and the second half of the superimposed caption when the designation of the channel is switched during the display operation.

OBJECT AND SUMMARY OF THE INVENTION

The present invention is based on the recognition of the above problems, and an object of the present invention is to provide a picture information reproducing and processing apparatus in which the visibility of superimposed characters is improved.

Another object of the present invention is to provide a picture information reproducing and processing apparatus in which picture being displayed can be switched to a picture of a newly designated channel immediately when a different channel of picture information recorded as the subcode is designated.

According to a first aspect of the present invention, a picture information reproducing and processing apparatus is provided with a display mode changing device for changing the mode of displaying a picture signal corresponding to a graphic code including the picture information inserted as the subcode.

According to another aspect of the present invention, a picture information reproducing and processing apparatus has a structure in which N memories are provided, control operations are performed such that each of graphic codes of N channels is recorded in each of the N memories and the content stored in one of N memories designated by a command is read-out, and a picture signal is generated correspondingly to graphic code obtained by that control operation.

BRIEF DESCRIPTION OF THE DRAWINGS

FIG. 4 is a diagram showing the construction of "write font foreground/background" instruction;

FIG. 5 is a diagram showing "load color look-up table color 0 through color 7" instruction;

FIG. 6 is a diagram showing the sort of recording modes in the case of recording a picture on a composite disc;

FIG. 7 is a diagram showing the construction of "load transparency control table";

FIG. 8 is a diagram showing the correspondency between the bit pattern of TCB and the mixing ratio;

FIGS. 9A through 9C, when combined, are a block diagram showing an embodiment of a picture information reproducing and processing apparatus according to the present invention, and FIG. 9 is a diagram showing the arrangement of FIGS. 9A through 9C;

FIG. 12 is a block diagram showing a specific configuration of the coded information signal reproducing and processing circuit 31 in the apparatus shown in FIGS. 9A through 9C;

FIG. 17 is a diagram showing the arrangement of FIGS. 17A through 17C.

DETAILED DESCRIPTION OF PREFERRED EMBODIMENTS

An embodiment of the method according to the present invention will be explained with reference to FIGS. 9A-9C through 19 of the accompanying drawings.

Figure 1:
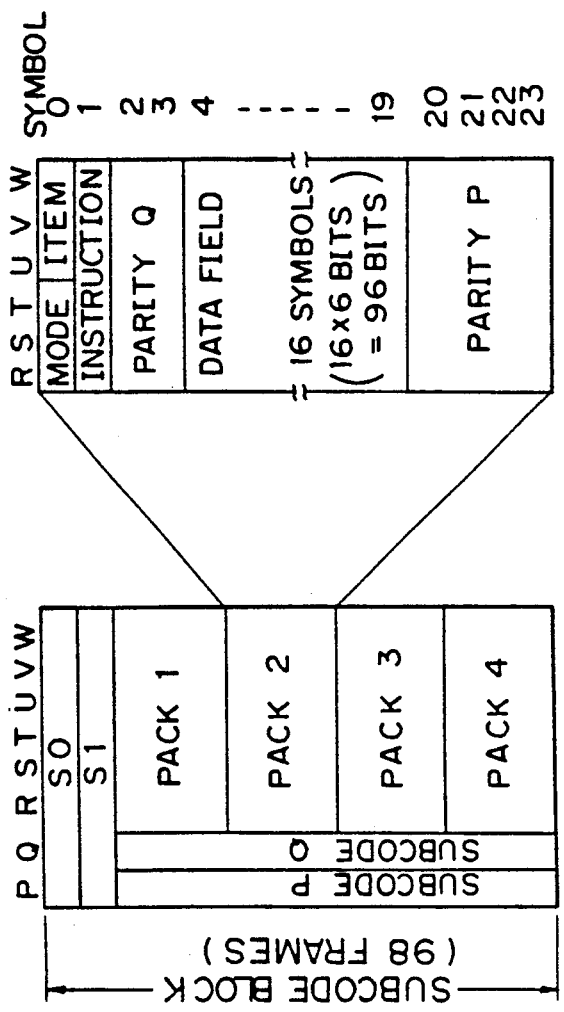
FIG. 1 is a diagram showing the recording format of subcode data.
Figure 2:
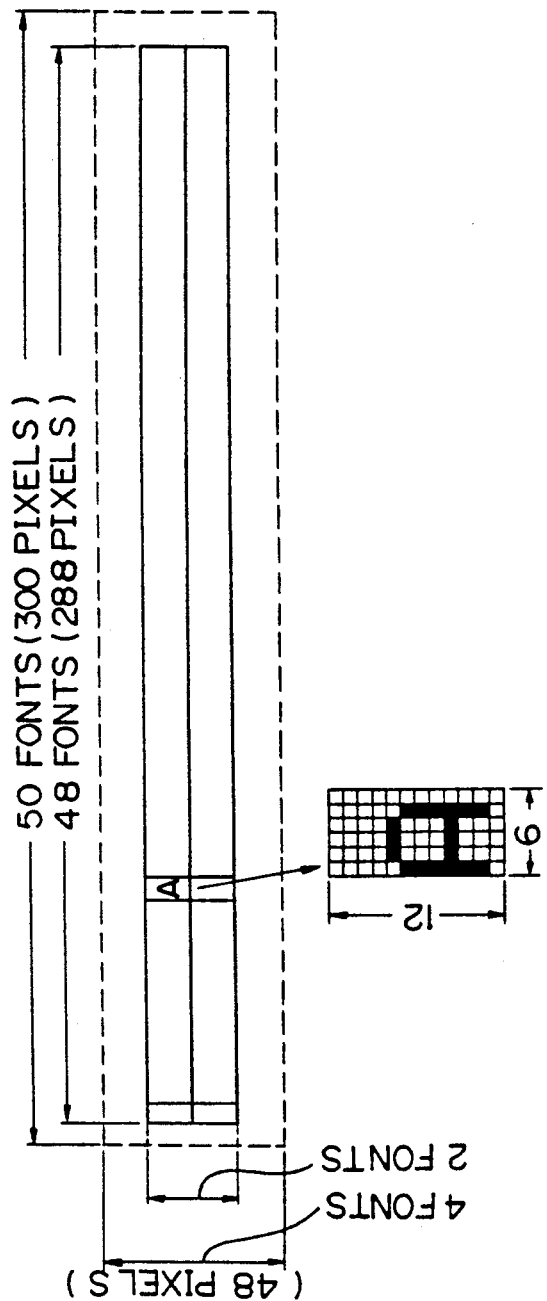
FIG. 2 is a diagram showing the structure of picture in the "line-graphics mode"
Figure 3:
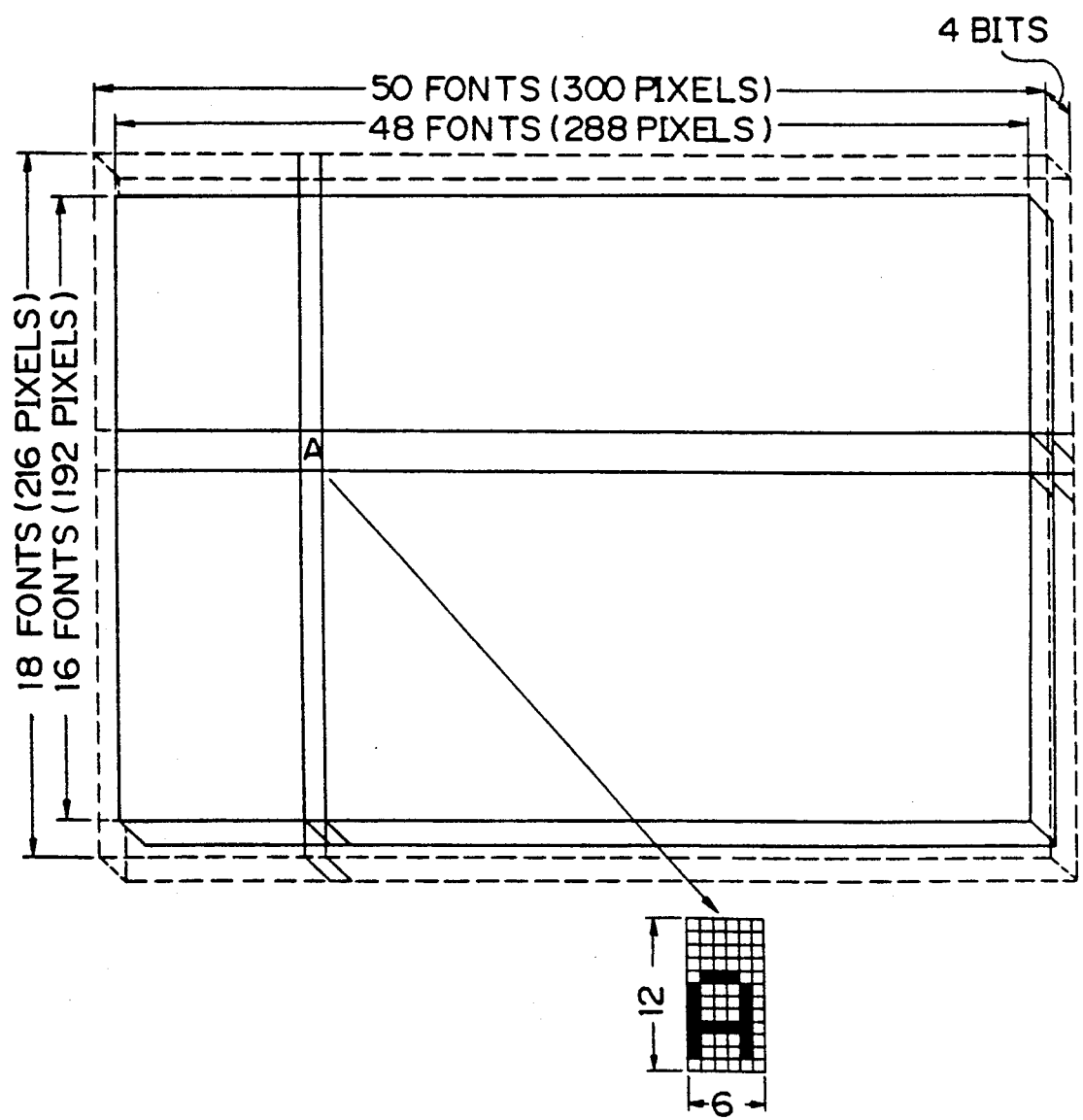
FIG. 3 is a diagram showing the structure of picture in the "TV-graphics mode"
Figure 9A:
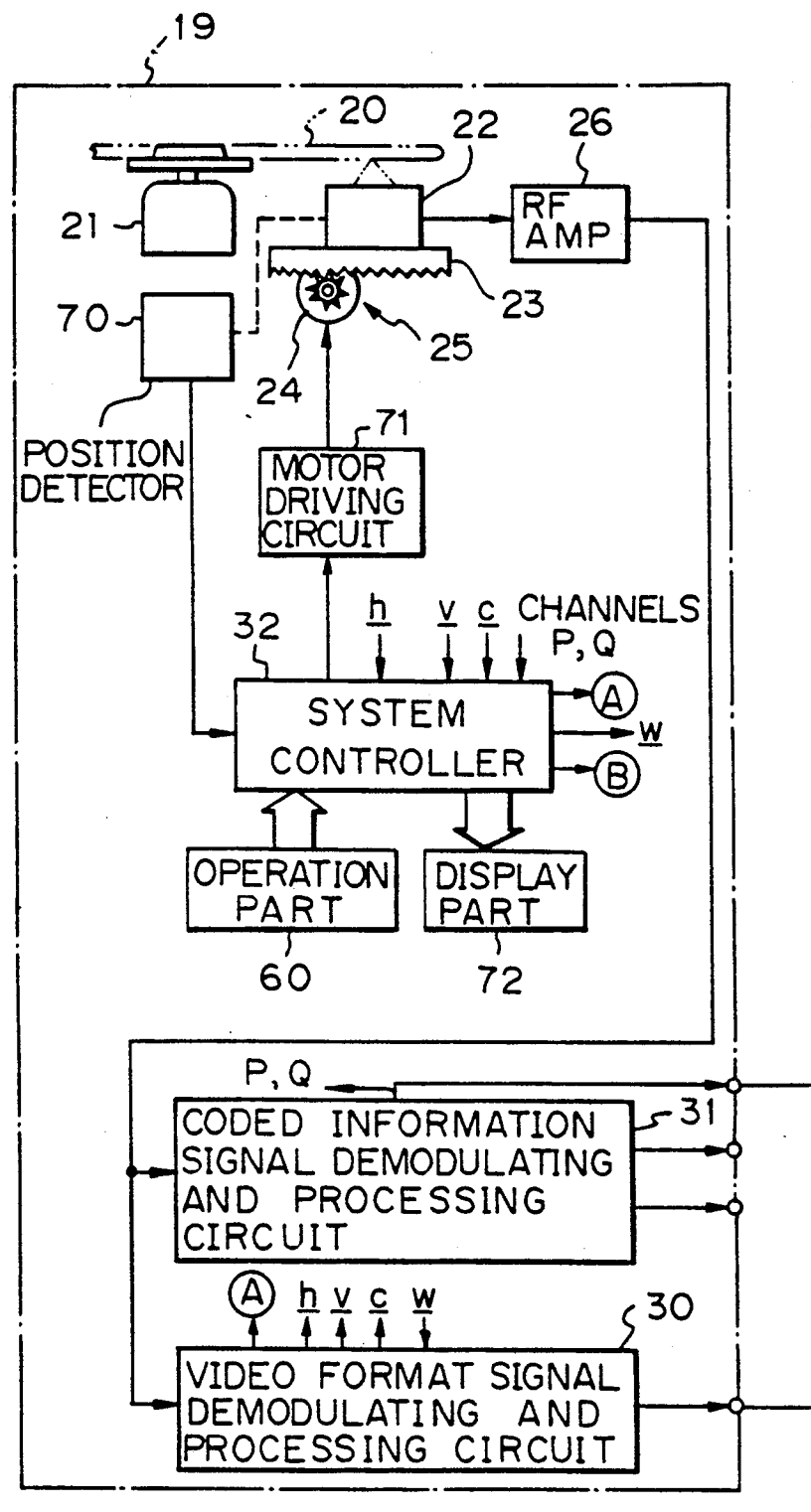
Figure 9C:
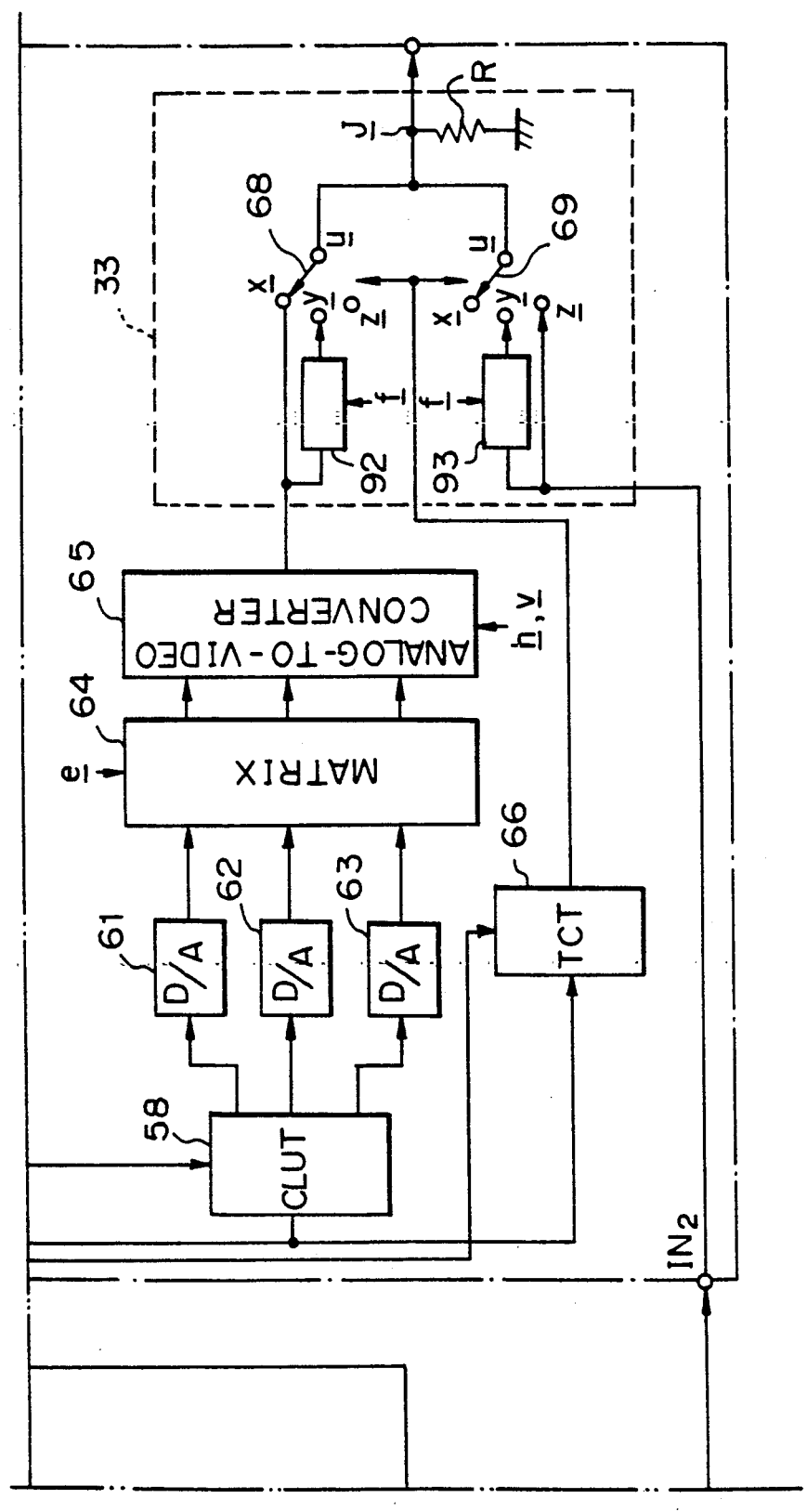

In FIGS. 9A through 9C, a disc 20 is rotated by a spindle motor 21, and information recorded on the disc 20 is read by an optical pickup 22.

Figure 10:
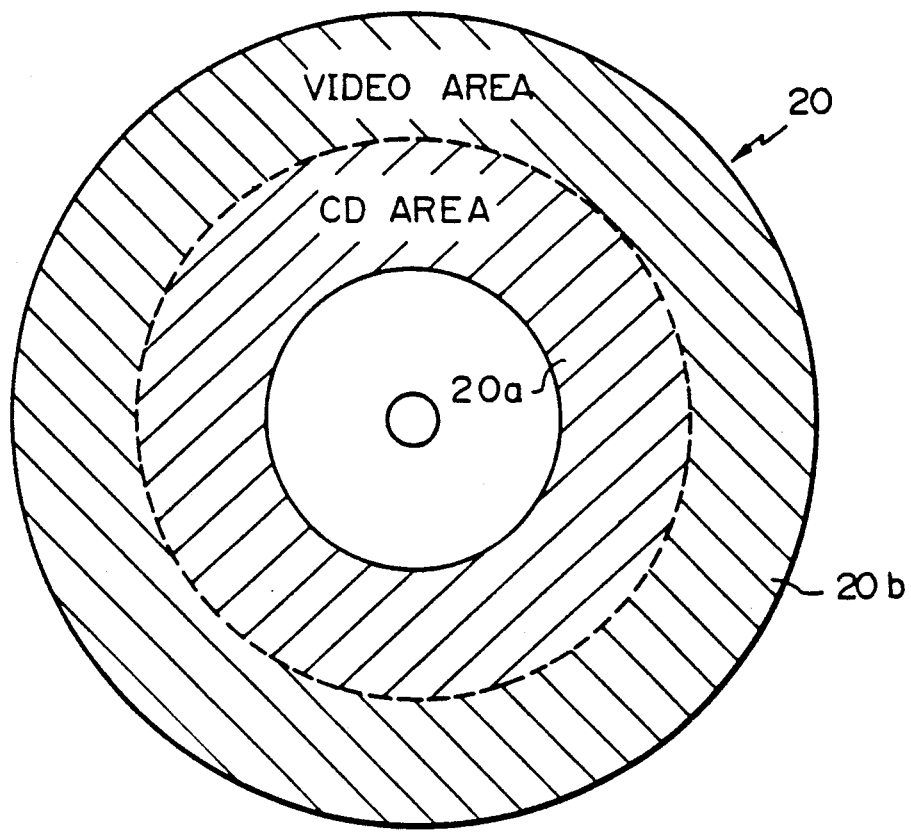
FIG. 10 is a diagram showing recording area of a composite disc.

The disc 20 is, for example, a composite disc shown in FIG. 10. As shown, the composite disc 20 has a first area 20a disposed in an inner peripheral area of the disc (this area being referred to hereinafter as the CD area) in which is recorded a digital audio signal with the subcode including picture information being inserted, and a second recording area 20b (this area being referred to hereinafter as the video area) containing an FM-modulated video format signal and a superimposed digital audio signal with the subcode including picture information being inserted, wherein the superimposition is performed by using a frequency multiplexing system. Since the video format signal contains higher frequency components than the POM signal, it is necessary to rotate the disc at a higher speed of rotation during the recording of signals in the video area 20b, than during the recording of the signal in the CD area 20a. Therefore of course it is necessary, in the playing time, to reproduce the signal by rotating the disc a the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include information showing whether the disc itself is a composite disc or a disc of other type.

The pickup 22 for reading information of the disc 20 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is movable in the direction of disc radius by a direct drive of a transmission mechanism 25 which in turn has a slider motor 24 as a source of driving force, and made by a combination of rack and pinion gears A read-out RF (radio frequency) signal outputted by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and configured to selectively output one of the video format signal outputted by the demodulation circuit and the video format signal read-out from the memory in accordance with a changeover command from a system controller 32. The video format signal outputted by the video format signal demodulating and processing circuit 30 is supplied, as a video output signal of disc player 19, to a video switch 33 in the picture information reproducing and processing apparatus 34 according to the present invention. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is configured to generate analog audio signals by demodulating the PCM audio signal in the RF signal, separate the subcode of the PCM audio signal and output the subcode.

Among the subcode outputted by the coded information processing circuit 31, two bits of the channels P and Q are supplied to the system controller, and the bits of channels P through W are supplied to the picture information reproducing and processing apparatus $4 as the subcode output of the disc player 19.

A position detector 70 is provided in the vicinity of the path of the movement of pickup 22 along the radial direction of disc, and serves to detect when the beam spot emitted from the pickup 22 has reached a position corresponding to the vicinity of the boundary between the CD are and the video area of a composite disc, to produce a detection signal. By the generation of this detection signal, a state that the pickup 22 has reached to the video area can be detected. The position detector 70 can have a known structure including for example an optical sensor. The detection signal outputted by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode outputted from the EFM demodulation circuit 42, disc designation information from an operation part 60 indicating whether the disc to be played is a compact disc or a composite disc, and mode designation information from the operation part 60, indicating whether the reproducing area is only the CD area or the video area, or both CD and video areas in the case of the playback of a composite disc. In this system controller 32, the processor executes processing of the signals inputted in accordance with programs previously stored in the ROM, and performs the control operation of each part of the video format signal demodulating and processing circuit 80, the coded information demodulating and processing circuit 31, a drive circuit (not shown) for driving the spindle motor 21, the driving circuit 71 for driving the slider motor, and the display part 72.

In the picture information reproducing and processing apparatus 34, the bits of the channels R through W outputted by the coded information signal demodulating an processing circuit 31 are supplied to a de-interleave and error correction circuit 52 through an input terminal $IN_1$. In the de-interleave and error correction circuit 52, the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack, and to supply to each part signals respectively indicative of the modes and the instruction.

Output data of the de-interleave and error correction circuit 52 are supplied to a memory controller 54. The memory controller 54 is provided with the horizontal and vertical sync signals hand v separated by a sync separator circuit (not shown) from the video format signal outputted by the disc player 19. The memory controller 54 senses data indicating the color number of each pixel of each picture channels in the output data of the de-interleave and error correction circuit 52 by using the kind of the modes and the instruction indicated by the output of the mode/instruction decoder 53, and supplies those data to a multiplexer 55 together with control data according to the picture channel. The memory controller 54 supplies write address data according to pixels corresponding to the data supplied to the multiplexer 55 and write command pulses to one of 16 video memories 56a through 56 which corresponds to the picture channel of the data supplied to the multiplexer. Also, the memory controller 54 supplies read address data which sequentially varies with the horizontal and vertical sync signals h and y and read command pulses to the video memories 56a through 56p. The multiplexer 55 is configured to selectively supply data indicating the color number of each pixel outputted by the memory controller 54 to one of video memories 56a through 56p corresponding to the control data.

The video memories 56a through 56p are respectively made up of a RAM having addresses corresponding to all pixels on a picture having 50 "fonts" by 18 "fonts" in the row and column directions, and four bits of data can be stored in each address.

Data outputted from the video memories 56a through 56p are supplied to a selector 57. The selector 57 is configured to selectively output one of data read out from each of the video memories 56a through 56p by a channel designation data d outputted from an operation part 91 in accordance with a key operation. Output data of the selector 57 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordance with the kind of the modes and the instruction indicated by the output signal of the mode/instruction decoder 53, and hold the color data corresponding to each color number, and configured to select and output color data of the color number designated by the data outputted from the selector 57.

The output data of this CLUT 58 is made up of three data respectively representing the level of one of the R, G, B color signals by using four bits. The three data outputted by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 68 through a matrix circuit 64. The matrix circuit 64 is configured to change-over the connection between the D/A converters 61 through 63 and the analog-to-video converting circuit 65 in accordance with a color control data e outputted from the control part 91 according to the key operation. The analog-to-video converting circuit 65 is configured, for example, to form a video signal of the NTSO system by the steps of obtaining a luminance signal and two color difference signals by the output signals of the D/A converting circuits 61 through 63 supplied through the matrix circuit 64, generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and sent subsequently.

In addition, the output data of the de-interleave and the error correction circuit 52 are also supplied to a transparency control table 66 (this table being referred to hereinafter as the TCT). The TCT 66 is based on the picture information recording and reproducing system using the subcode which is separately proposed by the applicants of the present application and others, and the TCT 66 is configured to detect a "load TCT" instruction in the output data of the de-interleave and error correction circuit 52 in accordance with the kind of the modes and instruction indicated by the output signal of the mode/instruction decoder 53, hold transparency control bits TCB-0 through TCB-15, and output by selecting one of the TCB-0 through TCB-15 being held, corresponding to a color number indicated by the data outputted from the selector 57.

The output signal of the TCT 66 is supplied to a video switch 33 as a control signal. In addition to the output signal of the TCT 66, the video format signal obtained from the subcode and outputted by the analog-to-video converting circuit 65, and the video format signal outputted by the video format signal demodulating and processing circuit 80 are supplied to the video switch 33.

In the video switch 33, the video format signal obtained from the subcode is supplied to a stationary contact x of a changeover switch 68, and also supplied to its stationary contact y through a variable resistance circuit 92. The variable resistance circuit 92 is configured to vary its resistance value in response to mixing ratio control data f outputted from the operation part 91 in accordance with a key operation. No connection is made to a stationary contact z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66. The video format signal outputted from the video format signal demodulating and processing circuit 30, which is supplied through an input terminal $IN_2$, is directly supplied to a stationary contact z of a changeover switch 69 and also supplied to its stationary contact y through a variable resistance circuit 93. The variable resistance circuit 93 is configured to vary its resistance value in response to the mixing ratio control data f outputted from the operation part 91 in accordance with the key operation. No connection is made to a stationary contact x of the changeover switch 69. The changeover switch 69, like the changeover switch 68, is configured to move its movable contact u to be in contact with one of its stationary contacts x, y, z in accordance with the control signal. The movable contacts u, u of the changeover switches 68 and 69 are mutually connected. A resistor R is connected between a common junction J of the movable contacts u, u and ground. A mixed signal of the video signal obtained from the subcode and the video format signal outputted from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts z, z are in contact with the stationary contacts y, y, the mixing ratio is equal to a value corresponding to resistance values of the variable resistance circuits 92 and 93. The signal derived at the common junction J is supplied to a video output terminal $OUT_3$.

Figure 11:
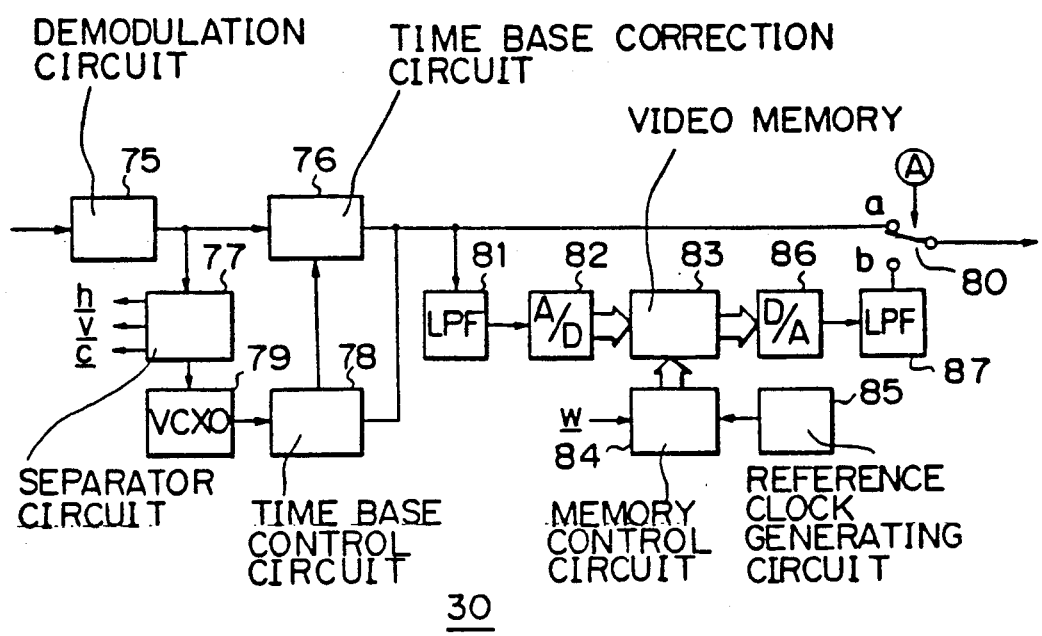
FIG. 11 is a block diagram showing a specific configuration of the video format signal processing circuit 30 in the apparatus shown in FIGS. 9A through 9C.
Figure 14:
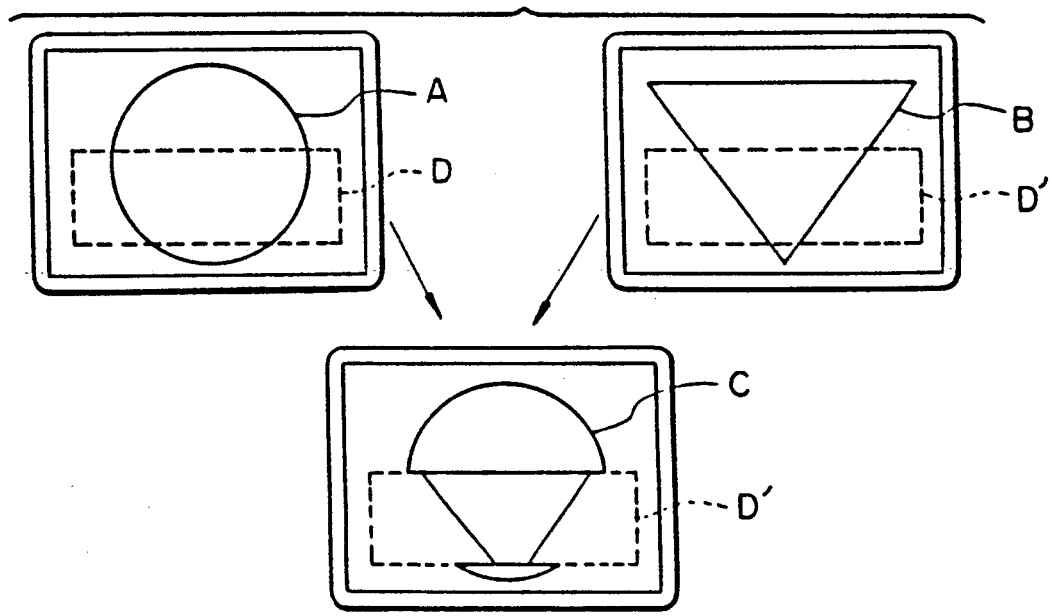
FIGS. 14, 15A through 15C, and 16 are diagrams showing pictures obtained by the apparatus shown in FIG. 9A through 9C.

FIG. 11 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. In addition, the separator circuit 77 is configured for example to include an oscillator, and to generate and output horizontal and vertical sync signals h and v having predetermined frequencies by using that oscillator when the video format signal is not supplied.

The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially read-out data written in each address of the video memory 83 in accordance with a clock from a reference clock generating circuit 85, and for rewriting the contents of each address of the video memory 83 in response to a write enable signal w which is outputted from the system controller 82. The data read-out from the video memory 88 is converted to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having passed through the video memory 83.

FIG. 12 is a block diagram showing a specific circuit construction of the coded information signal demodurating and processing circuit 31. The circuit is provided with a selector switch 35 which changes its switch position in accordance with the area to be played (the CD area or the video area) during the playing of a composite disc. The selector switch 35 is operated to a position a during the playing of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of the video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD area and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37. During the playing of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, an EFM signal is derived whose frequency characteristic and amplitude are almost the same as the EFM signal obtained during CD area playback.

During playback of a CD disc, the selector switch 35 is held in position a.

The playback EFM signal selected by the selector switch 35 is supplied to the EFM demodulation circuit 42 which performs the demodulation process, to obtain a PCM data that is digital data including audio information of left and right channels which is for example time-division multiplexed, and the subcode. The digital data including audio information outputted by this EFM demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is outputted. The error correction circuit 45 is configured to perform the error correction operation by using the CIRO (Cross Interleave Reed Solomon Code), and supply the digital data to the de-interleave and interpolating circuit 43, or supply the digital data to the de-interleave and interpolating circuit 48 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through amplifiers 49 and 50.

Operations of the processor in the system controller 32 in the above configuration will be specifically explained with reference to the flow chart of FIG. 13.

Assume that a composite disc is set in a playback position. When a start command is issued in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and performs the read-in of index code information which is recorded in an audio lead-in area at an innermost peripheral area of the disc (step S2). Subsequently, the processor judges whether or not the disc being set is a composite disc or not, on the basis of the read information (step S3). If it is judged that the disc being set is a compact disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in the step S3 that the disc being set is a composite disc, the processor immediately accelerates the slider motor 21 to a maximum rated speed of rotation for the video area (step S5). At the same time, the processor moves the pickup 22 toward the outer periphery of disc at a high speed by driving the slider motor 24 at a high speed (step S6). After these operations, when it is detected that the pickup 22 has reached to the video area by the detection signal from the position detector 70 (step S7), the processor starts the playback operation of the video area (step S8). During video area playback, the processor performs the control operation for writing the video information of at least one field (or one frame) long obtained from the disc in the video memory 83. This video information to be written may be, for example, first information in the video area, or designated by an address designation through the key operation of the operation part 60.

If it is detected that the playback of the video area has been completed, in step S9, then the processor decelerates the spindle motor 21 to the maximum rated speed of rotation for the CD area (step S10). At the same time, the processor drives the slider motor 24 at a high speed, to move the pickup 22 to the innermost peripheral position of the disc at a high speed (step S11). If it is detected (step S12) that the pickup 22 has reached the innermost peripheral position by the detection output signal of the above mentioned detector switch (not illustrated), the processor starts playback operation of the CD area (step S13). Concurrently to this, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback.

When the completion of the CD area playback is detected by reading the information of audio lead-out (step S14). the processor initiate the driving of the slider motor 24 to move the pickup 22 to its home position (step 15) unless any operational command is present. Furthermore, a loading mechanism (not shown in the drawings) performs disc ejection (step 16), to complete the playback operating sequence.

In the operating sequence described above, playback of the information recorded in the CD area of the composite disc is performed in steps S10 through S14 after the playback of information recorded in the video area in steps S1 through S9. When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., each of picture data of 16 channels are in turn stored in the video memories 56a through 56p by the memory controller 54 and the multiplexer 55. Data read-out from one of the video memories 56a through 56p according to the channel designation data d is sequentially outputted from the selector 57. When the picture data outputted from the selector 57 is supplied to the CLUT 58, color data of a color number indicated by the picture data is then outputted from the CLUT 58. A video format signal based on this color data is outputted from the analog video converting circuit 65, and supplied to the video switch 33.

If the "load TCT" instruction based on the recording and reproducing system, which is separately proposed by the applicants of the present application and others, is decoded in this state, the transparency control bits TCB-0 through TCB-18 respectively corresponding to each color number are then held in the TCT 66. Among the TCB-0 through TCB-15 being held, one corresponding to the color number indicated by the data read-out from the selector 57 is selectively outputted from the TCT 66, and the mixing ratio in the video switch 33 is designated by the output of the TCT 66. Thus, the mixing ratio between the video format signal outputted from the analog-to-video converting circuit 65 and the video format signal outputted from the video format signal demodulating and processing circuit 30 is controlled for each pixel. Consequently, a combination of pictures such as illustrated in FIG. 6 is made possible. Specifically, the mixing ratio is set to 100% for a portion corresponding to each pixel outside a region D of a picture A based on the video format signal outputted from the video format signal demodulating and processing circuit 30, and is set to 0% for a portion corresponding to each pixel within the region D. On the other hand, the mixing ratio is set to 0% for a portion corresponding to each pixel outside a region D' of a picture B based on the video format signal outputted from the analog-to-video converting circuit 65, and set to 100% for a portion corresponding to each pixel within the region D' of the picture B. Then a picture C can be formed by combining the portion of the picture A outside the region D and the portion of the picture B within the region D'.

Figure 15A:
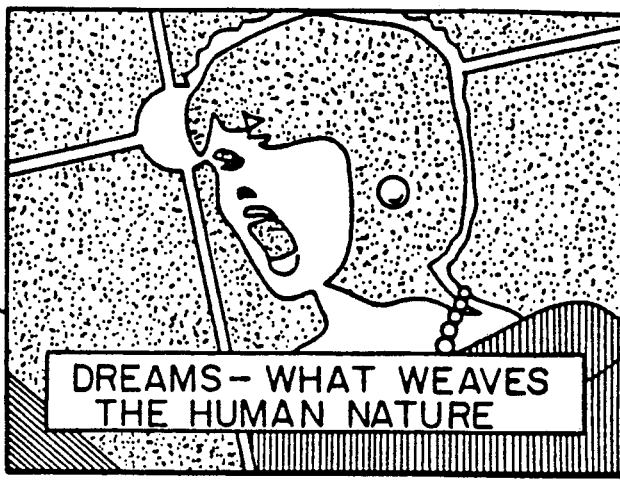
Figure 15B:
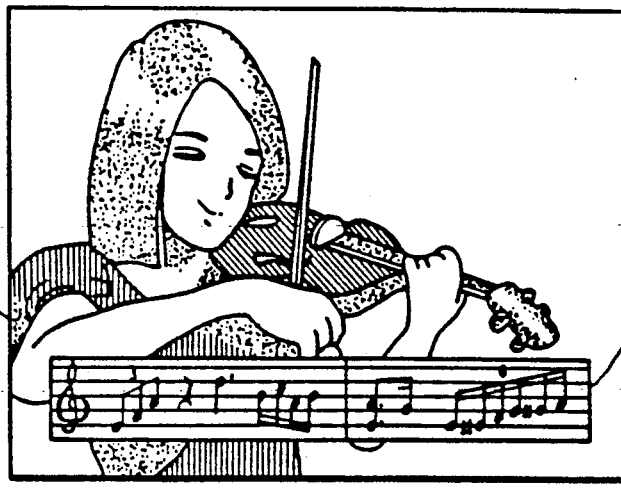
Figure 15C:

In this way, it is possible to compose a picture as illustrated in FIGS. 15A through 15C, in which a caption, a musical score, or an explanation of a scene, etc., obtained from the subcode is inserted into a moving picture obtained by the video format signal recorded in the video area.

Figure 16:

In addition, if a code occupying a channel other than the channel of the code forming the caption shown in FIG. 15A is made a code corresponding to a picture like a balloon of comic strips shown in FIG. 16 and inserted in the subcode, the position of the picture by the subcode can be changed by a manual operation since the picture channel is changed by a channel designation data d in accordance with the key operation in the operation part 91.

Moreover, since the connection between the D/A converting circuits 61 through 63 and the analog-to-video converting circuit 65 is switched by the color control data e outputted from the operation part 91 in accordance with the key operation, the color of the picture by the subcode can be changed by a manual operation.

Furthermore, since the resistance values of the variable resistors 92 and 93 are varied by the mixing ratio control data f outputted from the operation part in accordance with the key operation, and the mixing ratio between the video format signal obtained by the subcode and the video format signal outputted from the video format signal demodulating and processing circuit 30 becomes equal to value corresponding to the resistance values of the variable resistors 92 and 93 when the movable contacts u, u of the changeover switches 68 and 69 are connected to the stationary contacts y, y, the mixing ratio can be varied by a manual operation.

It will be appreciated from the foregoing explanation, the picture information reproducing and processing apparatus according to the present invention is provided with a display mode changing means for changing the mode in displaying the picture signal corresponding to the graphic code obtained from a recording medium and inserted as the subcode, in accordance with various commands. Therefore, the position and the color of characters of the superimposed caption by the subcode, as well as the mixing ratio between the characters of the superimposed caption and the moving picture, can be varied by the manual operation. In this way, it is possible to provide characters of the superimposed caption which are quite easy to see.

Figure 17A:
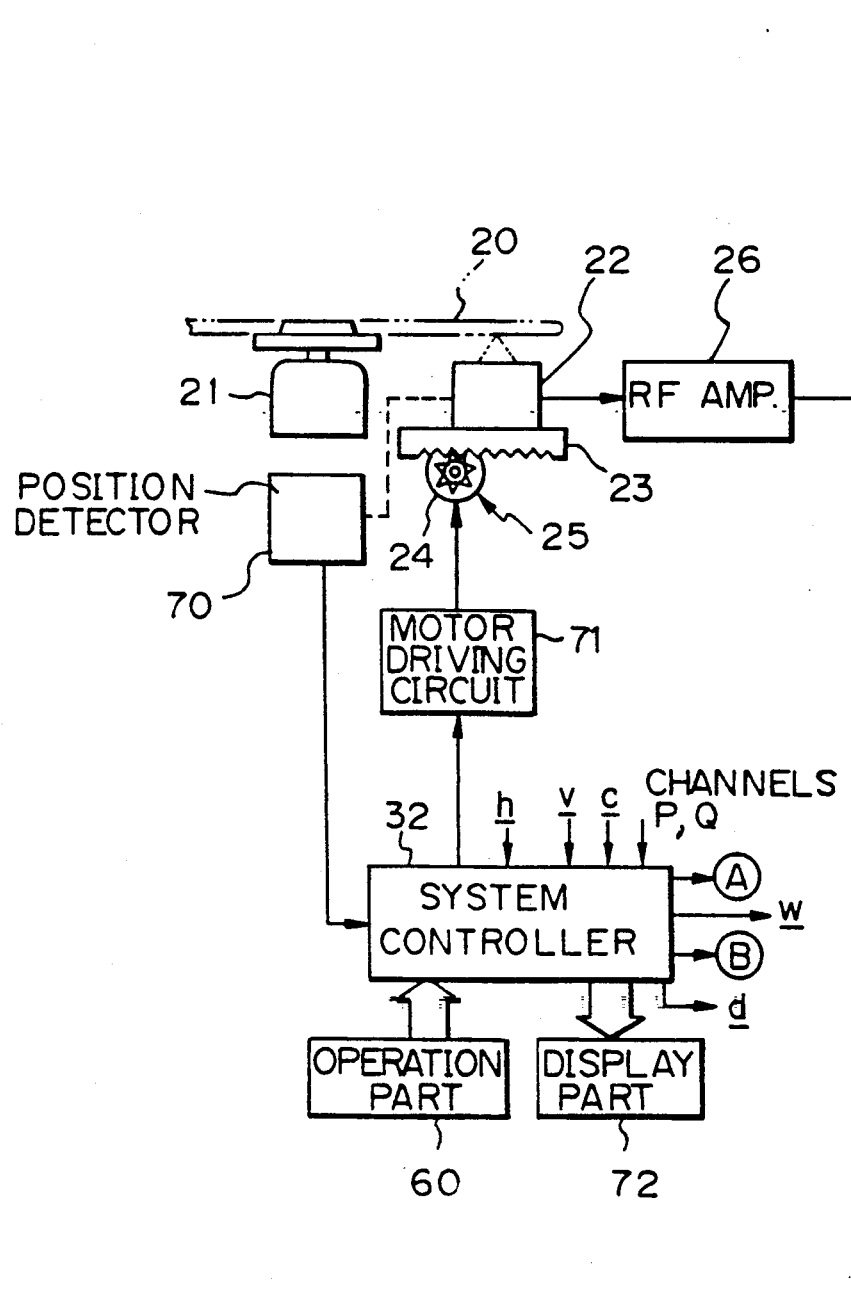
FIGS. 17A through 17C, when combined, are a block diagram showing another embodiment of a picture information reproducing and processing apparatus according to the present invention.

The second embodiment of the picture information reproducing and processing apparatus according to the present invention will be explained with reference to FIGS. 17A through 17C.

Since the basic construction of the apparatus of this embodiment is almost the same as that of the previous embodiment shown in FIGS. 9A through 9C, the explanation of the same components parts will not be repeated.

Figure 17B:
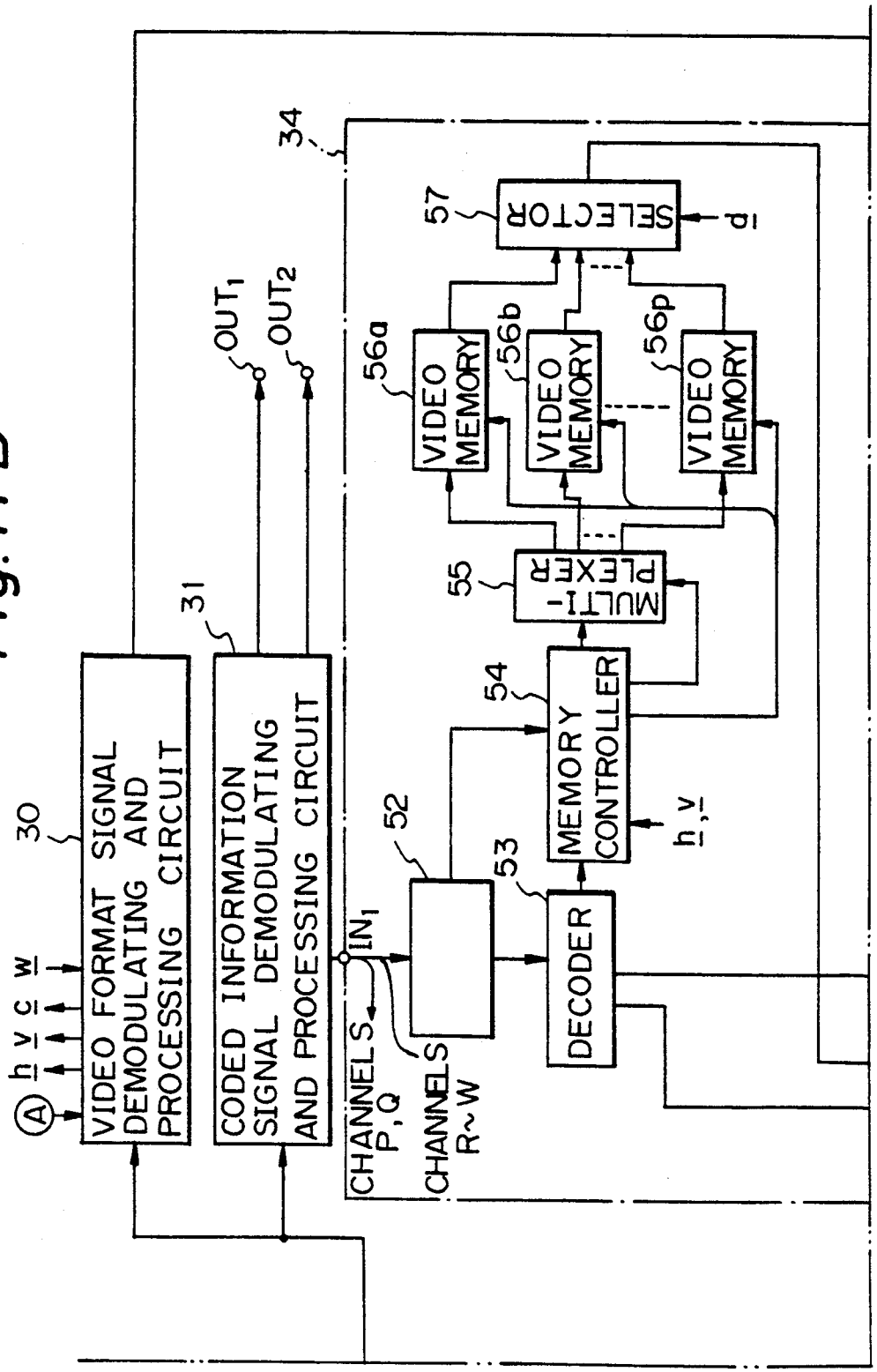
Figure 17C:
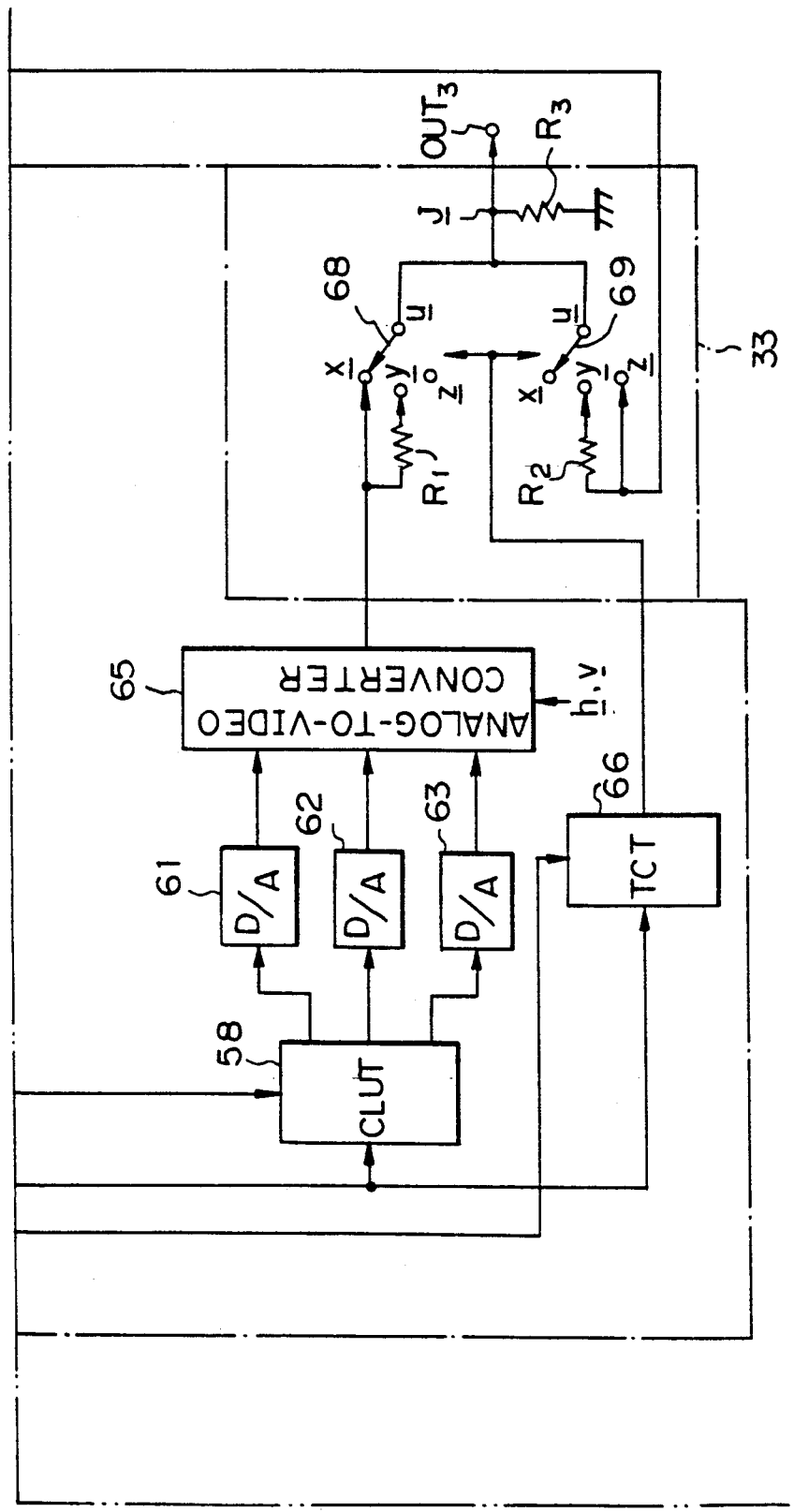

As illustrated in FIG. 17B, the selector 57 is configured to selectively output one of data read-out from the video memory 56a through 56p in accordance with a switch control data d which is outputted from the system controller 32. In addition, as illustrated in FIG. 17C, the output signals from the D/A converters 61 through 63 are directly supplied to the analog-to-video converting circuit 65.

Moreover, in the video switch 83, the video format signal obtained from the subcode is directly supplied to the stationary contact x of the changeover switch 68 and is supplied to its stationary contact y through a resistor R₁. On the other hand, the video format signal outputted from the video format signal demodulating and processing circuit 30 is directly supplied to the stationary contact z of the changeover switch 69 and is supplied to its stationary contact y through a resistor R₂. A resistor R₃ is connected between the common connection node J of the movable contacts u, u and ground. The resistance values of the resistors R₁ and R₂ are determined so that the mixing ratio becomes equal to a value between 20% and 80% when the movable contacts u, u are connected to the stationary contacts y, y.

Figure 13:
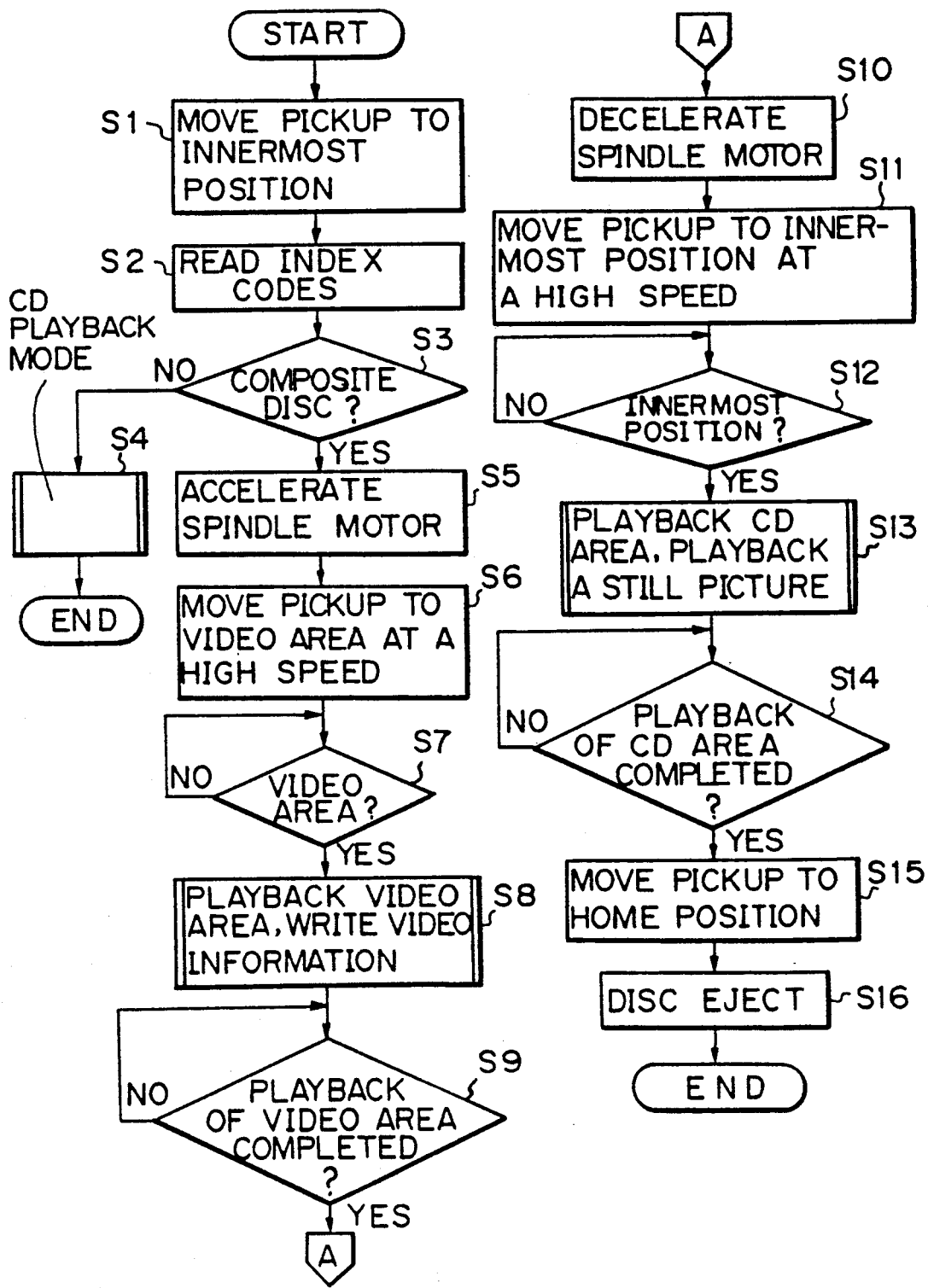
FIG. 13 is a flowchart showing the operation of processor in system controller 32 of the apparatus shown in FIGS. 9A through 9C.
Figure 18:
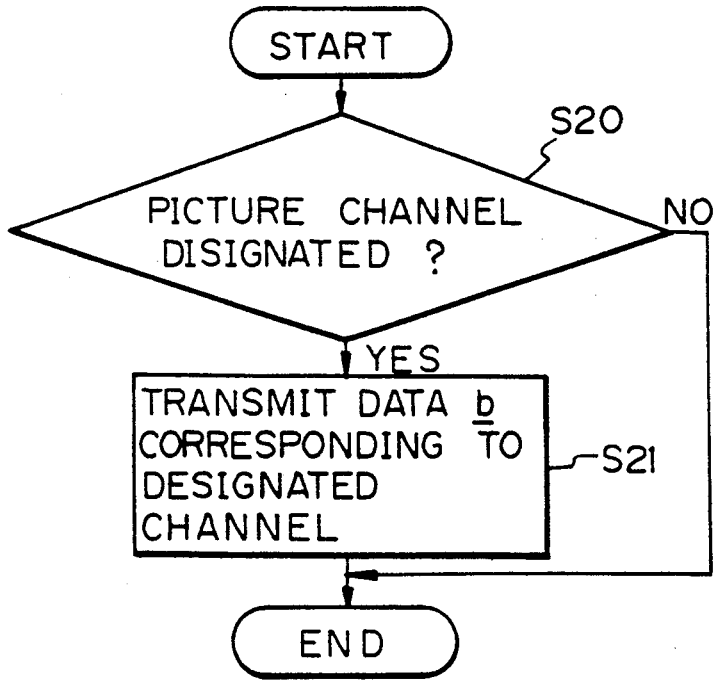
FIG. 18 is a flowchart showing the operation of processor in system controller 32 of the apparatus shown in FIGS. 17A through 17C.

With the thus constructed apparatus of the second embodiment of the present invention, the operational sequence illustrated by the flowchart of FIG. 13 is performed. However, the apparatus further performs the operations illustrated in the flowchart of FIG. 18.

Specifically, during the execution of the main routine, the processor proceeds to step S20 by an interruption of a timer and so on, to judge whether or not the designation of channel is performed by a key operation in the operation part 60. If it is judged in the step S20, that the designation of channel has been performed, the processor transmits the switch control data d corresponding to the designated picture channel to the selector 57 (step S21), and restarts the operation which was being performed immediately before the processor proceeded to the step S20. In the step S20, if it is judged that the designation of the picture channel has not been performed, the processor immediately restart the operation which was being performed immediately before proceeding to the step S20.

When the designation of picture channel is performed by the key operation in the operation part 60, the switch control data d corresponding to the designated picture channel is supplied to the selector 57, and data read-out from one of the video memories 56a through 56p corresponding to the designated picture channel is selectively outputted.

Thus, the data supplied to the CLUT 58 is immediately switched to the data of designated channel in response to the change in the designation of channel, and the reproduced picture will be immediately switched to a picture of the designated channel.

It will be appreciated from the foregoing, the picture information reproducing and processing apparatus according to the second feature of the present invention includes N memories, graphic codes of N-channels are respectively stored in the N memories, and a control operation is performed so that contents stored in one of the N memories corresponding to a command are read-out and outputted. Thus the apparatus is configured to form a picture signal corresponding to the graphic code read-out from one of the N memories. Therefore, by storing the graphic codes of each picture channel in corresponding memories, and reading out, when the designation of channel has been changed, the contents stored in on of the memories corresponding to a newly designated channel, it becomes possible to obtain only the graphic code of the newly designated channel. Thus, the displayed picture is immediately changed to the picture of the newly designated channel.

What is claimed is:

1. An apparatus for reproducing and processing picture information for forming a picture signal corresponding to a graphic code obtained from a recording medium on which, in addition to a video format signal and a coded information signal, graphic codes including picture information are recorded, said graphic codes being inserted as a subcode of said coded information signal, and for mixing said picture signal in said video format signal obtained from said recording medium, said apparatus comprising:

a first input means for receiving said subcode obtained from said coded information signal recovered from said recording medium;

a second input means for receiving said video format signal recovered from said recording medium;

a demodulation means for demodulating said graphic codes from said subcode supplied from said first input means;

a picture signal generating means for generating said picture signal from said graphic codes demodulated at said demodulation means;

a mixing means for mixing said picture signal generated at said picture signal generating means with said video format signal supplied through said second input means;

an operation means for generating a display mode changing command by a manual operation; and a display mode changing means connected to said operation means and at least one of said picture signal generating means and said mixing means, for changing a mode of display of said picture signal within a picture formed by said video format signal in response to said display mode changing command.

2. A picture information reproducing and processing apparatus as set forth in claim 1, wherein said display mode changing means is operative to change a display position of a picture by said picture signal.

3. A picture information reproducing and processing apparatus as set forth in claim 1, wherein said display mode changing means is operative to change the color of a picture by said picture signal.

4. A picture information reproducing and processing apparatus as set forth in claim 1, wherein said display mode changing means is operative to change a mixing ratio between said picture signal generated from said graphic codes and said video format signal.

5. An apparatus for reproducing and processing picture information for forming a picture signal corresponding to a subcode obtained from a recording medium on which, in addition to a coded information signal, graphic codes including picture information occupying N (N being a natural number equal to or greater than 2) channels are recorded, said graphic codes being inserted as the subcode of said coded information signal, said apparatus comprising:

an input means for receiving said subcode obtained from said coded information signal recovered from said recording medium;

N memories;

a demodulation means for demodulating said graphic codes from said subcode supplied from said input means;

a memory control means for performing control operations of writing said graphic codes occupying each of said N channels in said N memories respectively, and reading-out stored contents of one of said N memories in accordance with a switch command responsive to a selection of said channel of said picture information a picture signal generating means for generating said picture signal from a graphic code read-out from one of said N memories by said memory control means.

* * * * *